Aug. 4, 1942.    A. W. LEMMON    2,291,817
SHAFT BEARING FOR SETTING TANKS
Filed Nov. 9, 1940    2 Sheets-Sheet 1
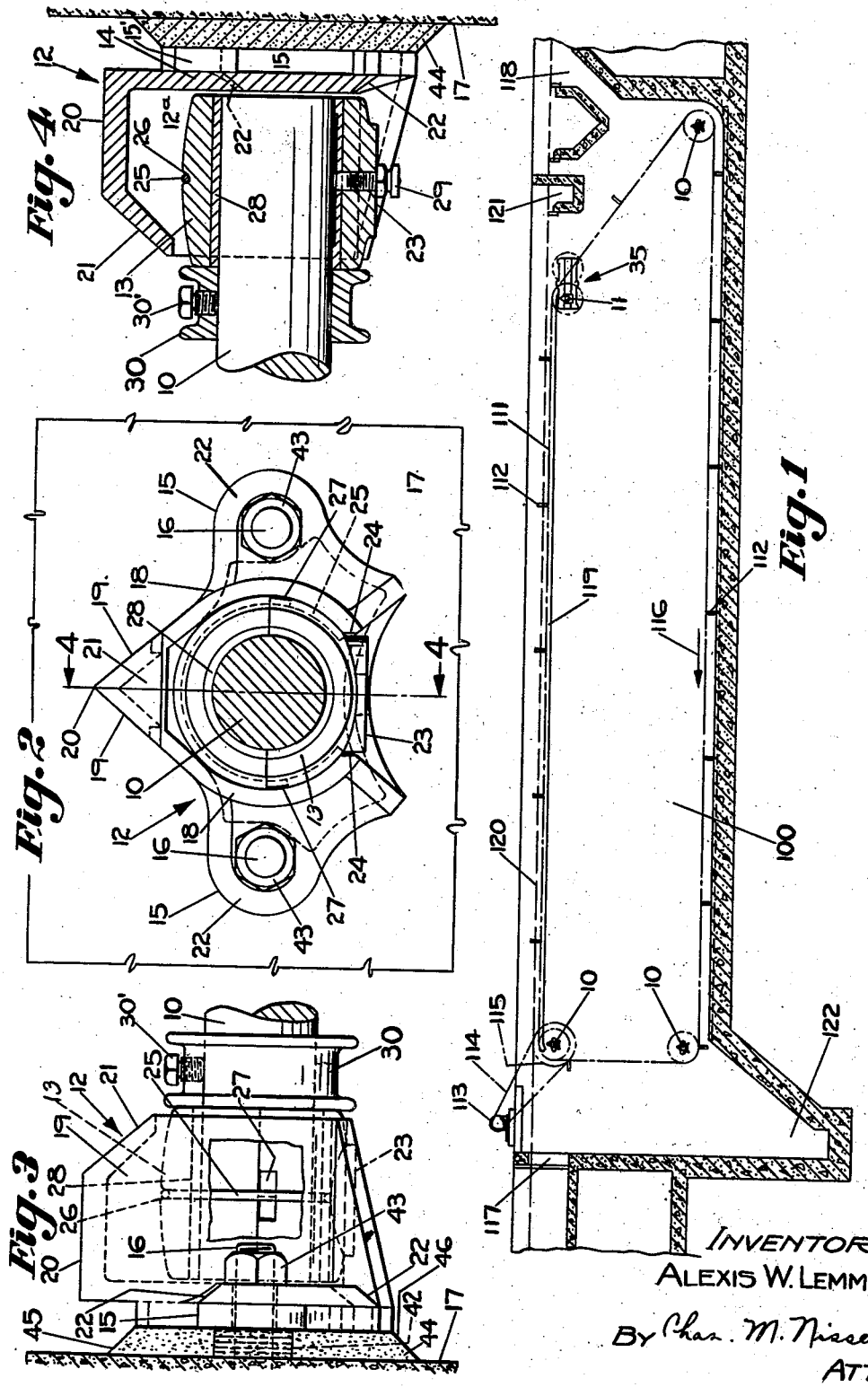
INVENTOR:
ALEXIS W. LEMMON,
By Chas. M. Nissen,
ATTY.

Aug. 4, 1942.  A. W. LEMMON  2,291,817
SHAFT BEARING FOR SETTING TANKS
Filed Nov. 9, 1940  2 Sheets-Sheet 2
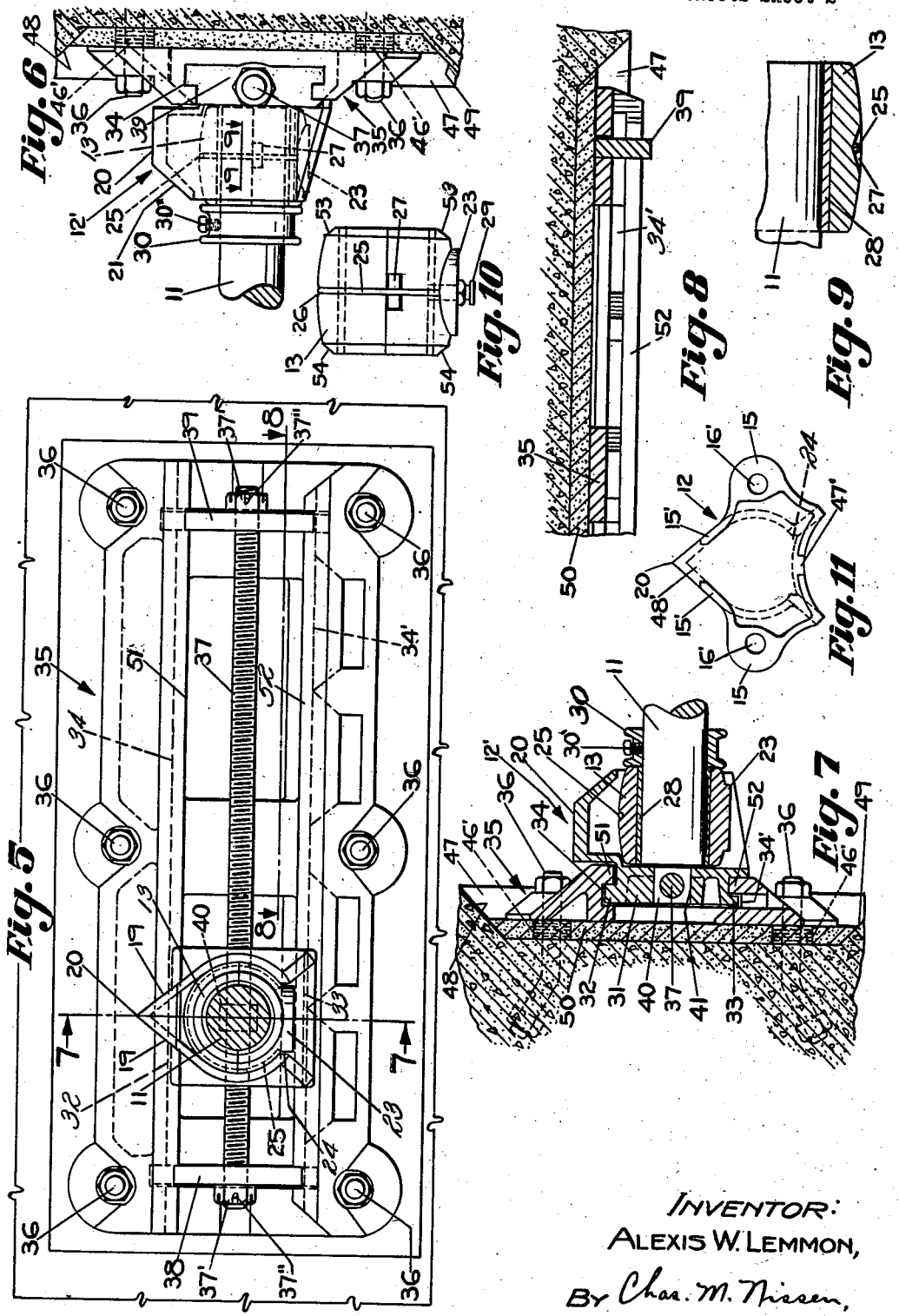
INVENTOR:
ALEXIS W. LEMMON,
By Chas. M. Nissen,
ATT'Y.

Patented Aug. 4, 1942

2,291,817

UNITED STATES PATENT OFFICE 2,291,817

SHAFT BEARING FOR SETTLING TANKS

Alexis W. Lemmon, Columbus, Ohio, assignor to The Jeffrey Manufacturing Company, a corporation of Ohio Application November 9, 1940, Serial No. 365,026

16 Claims. (Cl. 308—15)

This invention relates to shaft bearings particularly adapted for use in settling tanks of sewage disposal plants, and one of the objects of the invention is the provision of a shaft bearing that can be readily assembled on the rough wall of a concrete tank and any reasonable misalinement compensated for.

Another object of the invention is to provide a shaft bearing with means to prevent accumulation of sediment thereon when the shaft and bearing are immersed in a settling tank.

A further object of the invention is the provision of shaft bearings adapted to be mounted on conveyor chain take-up mechanism.

Other objects of the invention will appear hereinafter, the novel features and combinations being set forth in the appended claims.

In the accompanying drawings:

Fig. 1 is a sectional elevation of the sedimentation tank having a sludge collecting scraper conveyor operating over four shafts each of which is mounted in bearings of the type embodying my improvements;

Fig. 2 is an elevational view of one type of bearing mounted on an inner wall of the sedimentation tank;

Fig. 3 is a side elevational view of the structure shown in Fig. 2;

Fig. 4 is a sectional elevation taken on the line 4—4 of Fig. 2 looking in the direction of the arrows;

Fig. 5 is an elevational view of the bearing associated with take-up mechanism for the chain conveyor apparatus shown in Fig. 1;

Fig. 6 is an end elevational view of the structure shown in Fig. 5;

Fig. 7 is a sectional elevation taken on the line 7—7 of Fig. 5 looking in the direction of the arrows;

Fig. 8 is a sectional plan view taken on the line 8—8 of Fig. 5;

Fig. 9 is a sectional plan view taken on the line 9—9 of Fig. 6;

Fig. 10 is an elevational view of a modified journal bearing separated from the supporting housing; and Fig. 11 is a rear elevational view, reduced in size, of the journal bearing supporting bracket shown attached to the tank wall in Fig. 2.

Referring to the drawings, the reference number 100 indicates in general a sedimentation tank made of a monolith of poured concrete. The inner upright opposite walls of such tanks are not always in true vertical planes and may have rough and irregular surfaces at various portions thereof. To such opposite inner walls of the sedimentation tank 100 must be secured journal bearings for the support of transverse shafts for carrying sprockets meshing with spaced-apart chains having attached thereto spaced-apart flights adapted to act as scum conveyors along the surface of the liquid in the tank and as sludge conveyors along the bottom of the tank. Journal bearings of the self-alining type are of importance but these must be substantially free of any projecting horizontal flat faces so as to prevent an accumulation of sediment from the sewage or water being purified in the sewage disposal plant or water purification system.

Referring to Fig. 1, it will be seen that the shafts 10 and 11 carry spaced-apart sprockets which mesh with spaced-apart chains to which are attached the transverse conveyor flights 112. A motor 113 is connected by a sprocket chain 114 to a sprocket 115 so as to secure operation of the endless conveyor in the direction of the arrow 116. The sewage enters at the influent 117 for flow through the tank 100 toward the right, as viewed in Fig. 1, to the effluent opening 118. The upper run of the conveyor 111 moves along a guideway 119 so that the scum floating on the liquid surface 120 will be moved toward the right for flow into the scum trough 121. The lower run of the conveyor 111 moves in the direction of the arrow 116 to cause the flights 112 to scrape the sludge from the bottom of the tank into the sump 122.

The ends of the shafts 10 are supported and journaled as illustrated in Figs. 2, 3 and 4. At 35 is mounted take-up mechanism to adjust the slack in the chains of the endless conveyor apparatus 111. The ends of the shaft 11 are journaled and supported as shown in Figs. 5, 6 and 7.

The journal bearings for the ends of the shafts 10 and the mechanism for supporting the journal bearings on opposite inner walls of the tank 100, are shown in Figs. 2, 3 and 4. A bracket housing 12 is provided with a rear or back plate 14 having ears 15, 15 which extend in opposite directions as shown in Fig. 2. Each of these ears is provided with an aperture for receiving the anchor bolts 16 which are imbedded in walls 17 of the tank 100 when the concrete monolith is poured.

On the rear of the back plate 14 are rearward extensions 15', 15', the rear surfaces of which are flush with the rear surfaces of the ears 15, 15. When the ears 15, 15 are mounted on the bolts 16, 16, by causing the latter to extend through the apertures 16', 16', it is desirable to provide means for spacing the bracket 12 from the wall 17 in accordance with the length of the shaft 10 so that the ends of the shaft will be spaced only a slight distance from the back plate 14, as shown in Fig. 4. For this purpose a plurality of shims 42 are placed on each of the bolts 16 before the ears 15, 15 are mounted on these bolts. After this has been done, the nuts 43, 43 may be tightened to securely anchor the housing 12 to the wall 17. By means of grouting or concrete 44 beveled at 45, 46, as shown in Fig. 3, the space back of the ears and the extensions 15', 15' may be filled.

Extending forwardly or outwardly from the back plate 14 are arcuate flanges 18, 18 which extend upwardly to form flat inclined faces 19, 19 terminating in a straight line peak 20. The front or open end of the housing 12 is closed at the top portion by a web 21 having an upper triangular flat face slanting downwardly and outwardly from the peak 20. It will thus be seen that three inclined intersecting planes slant downwardly from the straight line peak 20 for the purpose of shedding sediment which tends to accumulate thereon. The upper and outer edges may be beveled as indicated at 22, 22 to minimize the accumulation of sediment.

The journal bearing 13 is in general cylindrical in form but larger in diameter at the center than at its ends, as shown in Fig. 4. The journal bearing 13 may be made integral or in one piece or it may be split into sections, as shown in Fig. 3. A boss 23 of cylindrical form projects from the lower section of the journal bearing 13 through a slot 24 in the bottom of the housing 12 and between the lower ends of the arcuate flanges 18, 18. The lateral edges of such slot act as abutments by being engaged by the cylindrical boss 23 to prevent rotary movement of the journal bearings 13 on the axis of the shaft 10 and relatively to the housing 12.

As shown in Figs. 3 and 4, the journal bearing 13 is split into two halves and held together by a snap ring 25 positioned in the groove 26. As shown in Fig. 2, this snap ring 25 terminates short of a complete circle and therefore the journal bearing may be disassembled by inserting a sharp tool into the groove or recess 27 shown in Fig. 3, and prying the spring 25 from its groove 26.

The journal bearing 13 may be provided with a bushing 28 of bearing material and lubricated through a fitting 29 which may be connected to a grease pipe extended upward through the openings 47' and 48' to the source of grease supply outside the tank. The grouting 44 may be extended into the space back of the back plate 14 and between the ears 15, 15 after such grease pipe has been connected to the fitting 29 and extended to the source of grease supply. In fact, the grouting may be carried out to fill all spaces back of the plate 14 and beveling effected with such grouting at all places adjacent the wall 17 and even above the ears 15, 15 immediately adjacent the wall 17. Such grouting 44 not only co-operates with the shims 42 or other spacing means such as sections of lead pipe, to effect the proper spacing of the housing 12 from the wall 17, but also assists the anchor bolts 16 and the nuts 43 in anchoring the housing 12 to the wall 17, thereby preventing the housing 12 from working loose during operation of the conveyor apparatus 111 shown in Fig. 1.

The space between the inner walls of the arcuate flanges 18, 18 may be slightly greater than the largest outside diameter of the journal bearing 13. Therefore if there is any misalinement of the housings 12 on opposite walls of the tank 100 for a particular shaft, the journal bearing 13 may nevertheless be supported in proper position in the housing 12 because it is free to rock horizontally in the hollowed out body 12ª. The journal bearing is also free to rock in a vertical plane in the hollowed out body 12ª. Consequently proper alinement of the journal bearings 13 can be secured for the shaft 10 at the opposite walls in the tank. This self-alining feature which is provided for the journal bearings 13 enables them to be supported without any binding between the shaft and the bearings.

As stated above, the boss 23 projecting into the opening or slot 24 prevents undue rotation of the journal bearing 13 relatively to the supporting housing 12. In order to confine the boss 23 to its position in the slot 24 shown in Fig. 4, safety collars 30 are mounted on the shaft 10 in position to abut the outer end of the journal bearing 13, and by means of set screws 30' the collar 30 is prevented from moving along the shaft 10 after having been once adjusted to its abutting position. Endwise or axial movement of the shaft 10 is limited to a very small amount by the front walls of the back plates 14 at the opposite walls in the tank 100.

In order to disassemble the shaft from the housing and the bearings, the safety collars 30 are released and slid along the shaft a sufficient distance to permit the bearings to be moved along the shaft out of the housings 12, whereupon the ends of the shaft may be lowered through the slots 24 of the housings. The journal bearings 13 and the collars 30 may then be slipped from the ends of the shaft. Before the journal bearing is removed from the housing 12, the lubricant fitting 29 may be removed. It will thus be seen that the journal bearing may be removed from the supporting housing for renewal of the bushing 28 or for repair, without disturbing the anchoring of the housing on the inner walls of the tank.

It will also be seen that a one piece journal bearing may be as readily removed from the shaft 10 as a sectional journal bearing. Sectional journal bearings are preferred when composition renewable split bushings are included in the journal bearings. It should also be noted that whether a one piece journal bearing or sectional journal bearing is used in the housing 12, the space afforded for rocking of the bearing either laterally or up or down prevents any undue stress or strain being thrown on either of the bolts 16 during alinement of the bearings or during operation of the conveyor apparatus 111 shown in Fig. 1.

In the form shown in Figs. 5 to 8, inclusive, I have adapted the advantageous features of the construction shown in Figs. 2, 3 and 4 for use in connection with the chain take-up mechanism 35 for the shaft 11, as shown in Fig. 1. In this construction the back plate 31 of the housing 12' has upper and lower horizontal elongated tongues 32 and 33 which fit into and slide along grooves 34, 34' of the bracket or frame 35 which is mounted upon the walls of the tank by means of anchor bolts 36, 36. The opposite walls are provided with recesses 47 preferably beveled at the top and bottom as indicated at 48, 49 in Figs. 6 and 7. By means of shims 46' or other spacing means such as sections of lead pipe, the frame 35 may be spaced at the distance desired from the bottom of the recess 47. Grouting 50 may be relied on to fill in the space back of the bracket 35.

End plates or bearing blocks 38, 39, beveled at their ends, are inserted from the back of the frame 35. A relatively long threaded bar 37 is mounted in apertures of these end plates and threaded through a nut 40 held in a slot 41 in the back plate 31. After assembly the end plates are held rigidly in fixed positions by the screw 37 and the concrete grouting.

The slot 41 is so shaped that rotation of the threaded bar 37 will not cause rotation of the nut 40. Consequently the bearing member 31 will be caused to slide along the frame 35, being guided by the tongue and groove connections 32, 34 and 33, 34'. The threaded bar 37 is provided at each end with a nut 37' fixed to the bar by a cotter 37'' which prevents longitudinal movement of the threaded bar 37 relatively to the supporting frame 35. By applying a turning tool to either of the nuts 37', the rod 37 may be rotated to effect shifting of the housing 12' horizontally in either direction along the frame 35.

This take-up mechanism comprising the screw threaded bar 37 and nuts 37' is disclosed and claimed in my co-pending application Serial No. 375,962, filed January 25, 1941, for an improvement in Take-up mechanism for conveyor apparatus.

Fig. 8 is a sectional plan view on the line 8—8 of Fig. 5 and shows the bearing block 39 in fixed position relative to the stationary wall bracket 35. It should be noted that the wall bracket 35 is provided with a downwardly projecting elongated tongue 51 which fits into a groove extending along the upper side of the back plate 31 of the housing 12'. The wall bracket 35 is also provided with an upwardly extending tongue 52 which extends into an elongated groove extending along the lower side of the back plate 31 of the housing 12'. In Fig. 8 the lower tongue 52 of the wall bracket 35 is shown in plan.

Fig. 9 is a plan view taken on the line 9—9 of Fig. 6 and shows the shape of the groove or recess 27 into which a sharp tool is adapted to be inserted for the purpose of releasing the spring clip 25.

Fig. 10 is an elevational view of a journal bearing similar to that shown in the other views but having the front and rear peripheral edges beveled at 53 and 54 so as to facilitate shedding of sediment which tends to collect on the top of the journal bearing, since the latter is more or less stationary relative to the housing 12 or 12' which is immersed in the tank 100. It should also be noted that the triangular inclined face 21 of the housing 12 or 12' inclines downwardly and outwardly toward the collar 30. It can readily be seen by referring to Fig. 4 that when sediment is shed from the inclined surface 21 it tends to move toward the collar 30 but the latter is rotating during the operation of the conveyor 111 and therefore produces enough eddy currents to prevent the accumulation of sediment on the adjacent upper side of the journal bearings, and this is particularly true if the journal bearing is provided with the beveled peripheries 53 and 54. The journal bearings are symmetrically shaped so that they may be placed on either end of any shaft and inserted into a housing whether on one wall or the opposite wall.

From the foregoing it will be seen that the housing 12 being hollowed out at 12ᵃ and provided with the plane shedding top surfaces in intersecting planes, is in the nature of a canopy or peak cap housing for the journal bearing 13. The surface 21 as shown in Fig. 2 is triangular in shape.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a device of the class described, the combination with a shaft, of a journal bearing slidable axially thereof, a canopy supporting bracket having an open slot in one side for receiving one end of said shaft transversely of itself, said bracket having an opening for receiving said journal bearing when slid axially of said shaft while the latter is located in said canopy bracket, a boss projecting from said journal bearing into such open slot and adapted to engage the edges of the latter to prevent turning of the bearing relatively to said bracket, and abutment mechanism on said shaft to retain said bearing in said bracket by preventing the bearing from sliding axially of the shaft.

2. In shaft supporting mechanism, the combination with a housing support having a slot through which a shaft may be moved transversely of itself into the housing, such housing also having an opening through which such shaft may extend during rotation, of a journal bearing slidable lengthwise of the shaft to occupy a position spaced from such housing while such shaft is being moved through said slot into said housing, said journal bearing being slidable along said shaft into said opening after said shaft has been moved through said slot into said housing, mechanism seating said journal bearing in said housing to prevent rotary movement thereof relatively to said housing, and means for preventing movement of the journal bearing axially of the shaft when thus seated.

3. In a device of the class described, the combination with a canopy bracket, of a journal bearing insertable into said canopy bracket through an opening in one side thereof, and a boss on the bottom of said journal bearing in position to project into an open slot in the bottom of said canopy bracket, said slot having sufficient width to permit passage therethrough of the shaft for which said journal bearing is adapted.

4. In a device of the class described, the combination with a housing having communicating openings at right angles to each other, of a journal bearing insertable through one of said openings into said housing into position to engage the edges of the other opening, and a boss on said journal bearing in position to project into said last-named opening to engage said edges and thereby prevent turning of said journal bearing relatively to said housing.

5. In a device of the class described, the combination with a journal bearing, of a boss projecting downwardly therefrom, and a housing having an opening in one side for receiving said journal bearing endwise, and spaced-apart supports at the bottom of said housing at the edges of a bottom opening therein, said bottom opening being adapted to receive said boss between said edges.

6. In a device of the class described, the combination with a wall bracket, of a journal bearing, a housing for said journal bearing mounted on said wall bracket and having a horizontal open ended slot extending longitudinally of the journal bearing with the edges of the slot elongated and parallel to the axis of the journal bearing, and a device on said journaled bearing slidable axially into the open end of said slot when said journal bearing is inserted longitudinally into said housing, said device being adapted to engage the edges of said slot to restrict rotary movement of said journal bearing relatively to said housing.

7. In a device of the class described, the combination with a support having a hollow body with a bottom opening and a side opening in communication with each other, of a journal bearing insertable through said side opening into said hollow body, and a projection from the underside of said journal bearing into said bottom opening in position to engage the edges thereof and thereby restrict the rotary movement of said journal bearing relatively to said support when assembled in said hollow body.

8. In a device of the class described, the combination with a journal bearing having elliptically curved surfaces on its exterior, the diameters at the ends of the journal bearing being smaller than the diameter at the middle, of a housing for receiving and supporting said journal bearing, said housing having communicating side and bottom openings, and means between the journal bearing and said bottom opening for restricting rotary movement of said journal bearing relatively to said housing, said side opening being adapted to receive said journal bearing endwise for positioning in said housing above its bottom opening.

9. In a device of the class described, the combination with a journal bearing having ends of smaller diameter than the portion intermediate the ends, of spaced-apart elongated supports with the space between the same free and unobstructed, said supports being adapted to receive said journal bearing and the latter being free to rock to a limited extent in any direction relatively to said supports, and means projecting from the journal bearing into the space between said supports in position to engage the latter and restrict rotary movement of said journal bearing relatively to said supports.

10. In a device of the class described, the combination with a journal bearing larger in diameter at its middle than at its ends, of a housing having communicating side and bottom openings, the edges of the bottom opening being adapted to support said journal bearing, and a boss projecting from the middle of the bottom of said journal bearing into said bottom opening in position to engage said edges to prevent rotary movement of the journal bearing relatively to said housing while permitting rocking movement of the journal bearing in an upright plane extending through said openings.

11. In shaft supporting mechanism for settling tanks, the combination with a peak cap housing having three top downwardly sloping intersecting surfaces one of which is triangular in shape, of a journal bearing, and means for supporting said journal bearing in said housing.

12. In apparatus of the class described, the combination with a supporting housing having an opening in one side and an opening in its bottom, of a shaft, a journal bearing slidable along said shaft through said side opening into said housing, said shaft being movable upwardly through said bottom opening before said journal bearing is slid along said shaft into said housing, a boss projecting downwardly from said journal bearing into said bottom opening in position to engage the edges of said bottom opening and thereby prevent rotation of said journal bearing, and mechanism comprising a collar slidable along said shaft to retain the journal bearing in said housing.

13. Shaft supporting mechanism comprising the combination with an upright wall having a recess provided with an upper downwardly and outwardly sloping bevel surface and a lower downwardly and inwardly sloping bevel surface, of a wall bracket secured to said wall in said recess back of exposed portions of said sloping surfaces, a peak cap housing carried by said wall bracket, a journal bearing in said housing, and means for retaining the journal bearing in said housing, said shaft supporting mechanism being adapted to be immersed in a sedimentation tank and said sloping surface co-acting with said peak cap housing to shed sediment from the shaft supporting mechanism.

14. Shaft supporting mechanism comprising the combination with a sedimentation tank having a recess in an upright inner wall thereof, said recess being beveled to its lower edge downwardly and inwardly from the wall, of a wall bracket having a top surface beveled downwardly and inwardly from such recess, means for mounting said wall bracket in said recess leaving a portion of said lower beveled surface exposed, a housing carried by said wall bracket, and a journal bearing supported in said housing, said housing having flat top surfaces in intersecting planes and serving to co-operate with said lower exposed bevel surface and the said top beveled surface in shedding sediment tending to lodge on such surfaces.

15. In a device of the class described, the combination with a journal bearing comprising upper and lower members, of means for resiliently holding the two members of said journal bearing together, a boss projecting downwardly from the lower member, a housing having an opening in one side for receiving said journal bearing endwise, and spaced-apart supports at the bottom of said housing at the edges of a bottom opening therein, said bottom opening being adapted to receive said boss between said edges.

16. Shaft supporting mechanism for use in settling tanks comprising the combination with an upright wall of concrete, of a wall bracket, anchor bolts partially imbedded in the concrete wall and extending out therefrom through said wall bracket with nuts threaded on the outer ends of the bolts, a plurality of shims on each bolt between the back of the wall bracket and said concrete wall to predetermine the spacing between the wall bracket and the concrete wall back of the wall bracket, a journal bearing, a support for said journal bearing connected to said wall bracket, and grouting filling the space between the back of the wall bracket and said concrete wall, the shims being imbedded in such grouting, the construction and arrangement being such that when said nuts are tightened the back of the wall bracket will be pressed against said shims and the aforesaid predetermined spacing will be secured whereupon the grouting may be poured to fill the space between the concrete wall and the back of the bracket permanently imbedding said shims as fixed abutments.

ALEXIS W. LEMMON.